(12) United States Patent
Kang et al.

(10) Patent No.: US 8,361,663 B2
(45) Date of Patent: Jan. 29, 2013

(54) POROUS CARBON STRUCTURE, METHOD FOR PREPARING SAME, ELECTRODE CATALYST FOR FUEL CELL, AND ELECTRODE AND MEMBRANE-ELECTRODE ASSEMBLY INCLUDING SAME

(75) Inventors: Soon-Ki Kang, Suwon-si (KR); Geun-Seok Chai, Suwon-si (KR); Myoung-Ki Min, Suwon-si (KR); Chan Kwak, Suwon-si (KR); Alexey Alexandrovichserov, Suwon-si (KR)

(73) Assignee: Samsung SDI Co., Ltd., Gongse-dong, Gibeung-gu, Yongin-si, Gyeonggi-do (KR)

( * ) Notice: Subject to any disclaimer, the term of this patent is extended or adjusted under 35 U.S.C. 154(b) by 1099 days.

(21) Appl. No.: 12/292,847

(22) Filed: Nov. 26, 2008

(65) Prior Publication Data

US 2009/0136808 A1    May 28, 2009

(30) Foreign Application Priority Data

Nov. 27, 2007   (KR) .................. 10-2007-0121523

(51) Int. Cl.
  *H01M 4/36*    (2006.01)
  *C01B 31/00*   (2006.01)
  *B01J 21/18*   (2006.01)
  *B32B 3/00*    (2006.01)

(52) U.S. Cl. ............... 429/405; 423/445 R; 502/180; 428/312.2

(58) Field of Classification Search .............. None
  See application file for complete search history.

(56) References Cited

U.S. PATENT DOCUMENTS 5,266,300 A * 11/1993 Harrison .................. 423/628

FOREIGN PATENT DOCUMENTS

KR    2005-0116171 A1    12/2005

* cited by examiner

*Primary Examiner* — Emily Le
*Assistant Examiner* — Sarah A Slifka
(74) *Attorney, Agent, or Firm* — Robert E. Bushnell, Esq.

(57) ABSTRACT

The porous carbon structure according to one embodiment of the present invention includes mesopores, and at least two kinds of macropores having different average pore diameters. The porous carbon structure includes inter-connected pores and thereby increases specific surface area and improves electronic conductivity.

24 Claims, 8 Drawing Sheets

POROUS CARBON STRUCTURE, METHOD FOR PREPARING SAME, ELECTRODE CATALYST FOR FUEL CELL, AND ELECTRODE AND MEMBRANE-ELECTRODE ASSEMBLY INCLUDING SAME

CLAIM OF PRIORITY

This application makes reference to, incorporates the same herein, and claims all benefits accruing under 35 U.S.C. §119 from an application earlier filed in the Korean Intellectual Property Office on 27 Nov. 2007 and there duly assigned Serial No. 10-2007-0121523.

BACKGROUND OF THE INVENTION

1. Field of the Invention

The present invention relates to a porous carbon structure, a method of preparing the same, an electrode catalyst for a fuel cell, an electrode for a fuel cell, and a membrane-electrode assembly for a fuel cell. More particularly, the present invention relates to a porous carbon structure having high electronic conductivity and a large specific surface area, a method of preparing the same, an electrode catalyst for a fuel cell, an electrode for a fuel cell, and a membrane-electrode assembly for a fuel cell.

2. Description of the Related Art

A porous material is defined as a material formed with pores, and it is classified as microporous having a pore size of less than 2 nm, mesoporous having a pore size ranging from 2 to 60 nm, and macroporous having a pore size of more than 60 nm. Generally, a porous material can be applicable to various fields such as for a catalyst carrier, a separation system, a low dielectric constant material, a hydrogen saving material, a photonix crystal, and so on.

The porous material may include an inorganic material, a metal, a polymer, and a carbon-based material. Among them, the carbon-based material is a useful material applicable to various fields since it has excellent chemical, mechanical, and thermally stable characteristics.

Particularly, the porous carbon material can be widely applicable to a fuel cell field since it has excellent ion conductivity, anti-corrosion, cost saving, and surface characteristics. Various porous carbon materials are applied in the fuel cell field. Representative examples thereof include activated carbon and carbon black for a catalyst carrier. More specifically, an electrode catalyst carrier of a fuel call includes carbon black or Vulcan XC-72. The commercially available E-TEK catalyst includes a catalyst in which Pt—Ru alloy is supported in Vulcan XC-72.

Recently, different kinds of carbon materials such as meso-structure carbon, graphitic carbon nanofiber, and mesocarbon microbeads have widely been used as a catalyst supporter to improve metal catalyst activity. However, it is still difficult to synthesize a porous carbon material having a large specific surface area and an interconnection structure.

In addition, it is possible to synthesize a regularly arranged porous carbon material by a template duplication method using zeolite, a mesoporous material, and colloidal crystal. This synthesis method is used to provide a porous carbon material by injecting a carbon precursor into a solid porous silica mold, carbonizing the carbon precursor under a non-oxidation condition, and dissolving the silica mold in a HF or NaOH solution to provide a porous carbon material. However, it is difficult to increase the specific surface area of a carbon material having similar size pores. Accordingly, studies on porous carbon materials having an interconnection structure are still required.

SUMMARY OF THE INVENTION

One embodiment of the present invention provides a porous carbon precursor having high electronic conductivity and a large specific surface area.

Another embodiment of the present invention provides a method of preparing the porous carbon precursor. A further embodiment of the present invention provides an electrode catalyst for a fuel cell including the porous carbon precursor. A further embodiment of the present invention provides an electrode for a fuel cell including the electrode catalyst. Another embodiment of the present invention provides a membrane-electrode assembly including the electrode.

According to one embodiment of the present invention, provided is a porous carbon structure that includes mesopores and at least two kinds of macropores having different average pore diameters from each other.

The macropores have an average particle diameter of 100 nm to 2 μm.

The porous carbon structure includes two to four kinds of macropores having different average particle diameters from each other.

The mesopores have an average particle diameter ranging from 5 nm to 60 nm.

According to another embodiment of the present invention, provided is a method for preparing a porous carbon structure that includes steps of preparing a mixture of mesopore-forming particles, at least two macropore-forming particles having different average particle diameters, and a solvent; drying the mixture; removing the macropore-forming particles from the dried mixture to make a macroporous template including at least two macropores having different average pore diameters; injecting a carbon precursor between the mesopore-forming particles of the macroporous template to make a macroporous composite; carbonizing the macroporous composite; and removing the mesopore-forming particles from the macroporous composite to make a porous carbon structure including mesopores and at least two macropores having different average pore diameters.

According to a further embodiment of the present invention, provided is an electrode catalyst for a fuel cell that includes a catalyst material supported on the porous carbon structure.

According to a further embodiment of the present invention, provided is an electrode for a fuel cell that includes the electrode catalyst.

According to a further embodiment of the present invention, provided is a membrane-electrode assembly for a fuel cell including the electrode.

The porous carbon structure includes inter-connected pores, and thereby has improved electronic conductivity and a specific surface area.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Provided is a porous carbon structure that is applicable to various fields such as the electronic raw material field, due to its wide specific surface area. The porous carbon structure can have a form of a porous carbon matrix that includes mesopores and at least two kinds of macropores having different average pore diameters from each other.

The macropores of the porous carbon structure include at least two kinds (or two sets) of macropores having different average pore diameters. According to one embodiment, the macropores include 2 to 4 kinds of macropores having different average pore diameters. According to another embodiment, the macropores include 2 or 3 kinds of macropores having different average pore diameters. Within the range, since micropores having a smaller average pore diameter are formed in a space formed by adjacent macropores having a larger average pore diameter, the specific surface area of the carbon structure is increased. When the average pore diameter is uniform, the specific surface area of the carbon surface comparatively decreases.

Macropores of the porous carbon structure have an average pore diameter ranging from 100 nm to 2 μm. According to another embodiment, it ranges from 100 nm to 1.2 μm. According to a further embodiment, it ranges from 200 nm to 1 μm. According to a still further embodiment, it ranges from 250 nm to 500 nm. Within the range, it is possible to increase the specific surface area of the carbon structure by providing a sufficient space formed by adjacent macropores having a larger average pore diameter and by forming macropores having a smaller average pore diameter in the space.

Mesopores of the porous carbon structure have an average pore diameter ranging from 5 nm to 60 nm. According to another embodiment, it ranges from 15 nm to 50 nm. Within the range, it is possible to facilitate a fuel flow and a reactant release during a chemical reaction in a fuel cell. When the average pore diameter of mesopores is less than 5 nm, it causes problems in that the material is hard to transfer. On the other hand, when it is more than 60 nm, it causes problems in that a capillary phenomenon decreases.

The porous carbon structure is formed with mesopores and at least two kinds (or two sets) of macropores having different average pore diameters from each other, and the electronic conductivity thereof is improved by the interconnected pores.

Figure 1:
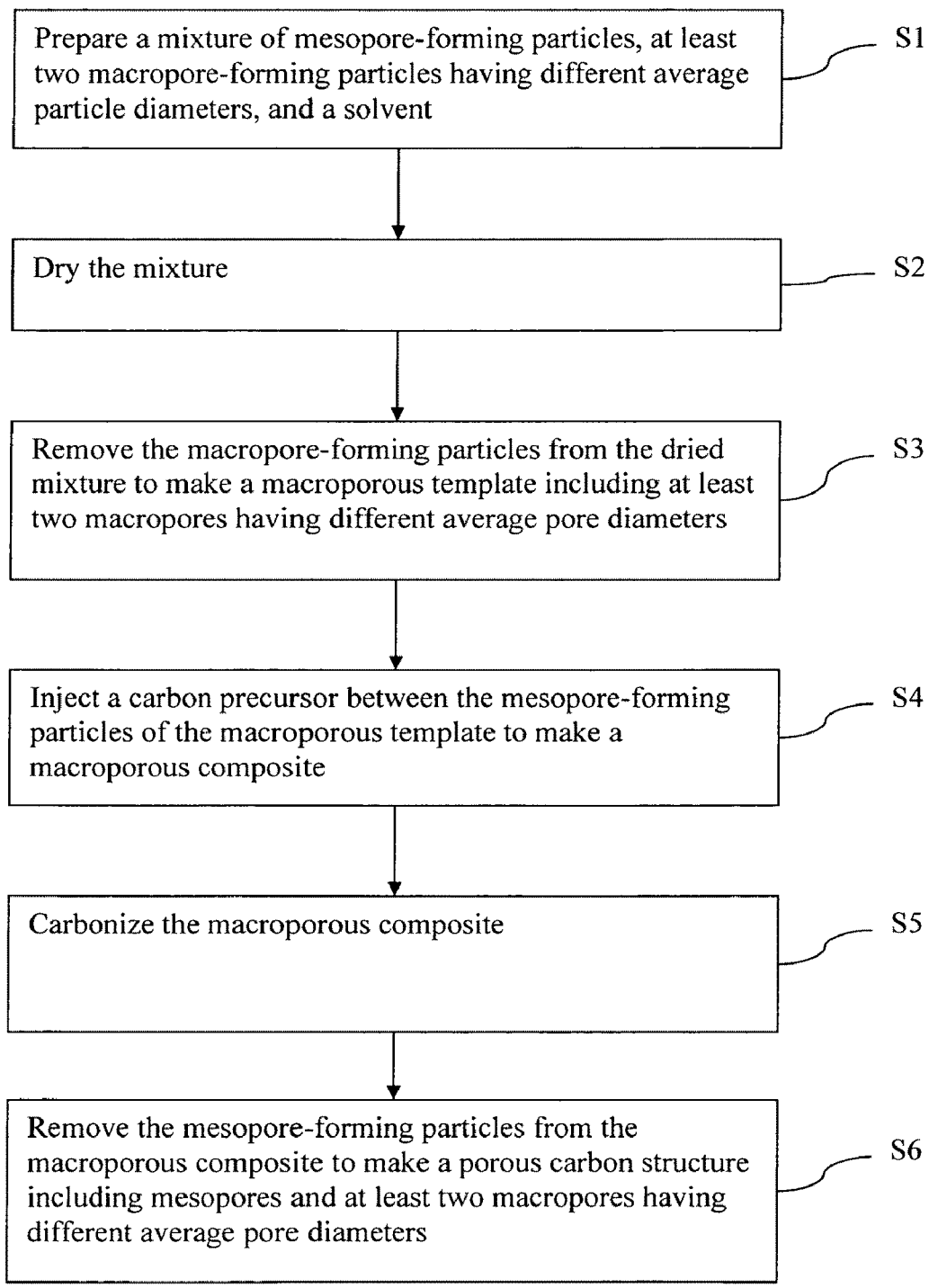
FIG. 1 is a flow chart showing a process for making a porous carbon structure according to one embodiment of the present invention.
Figure 2:
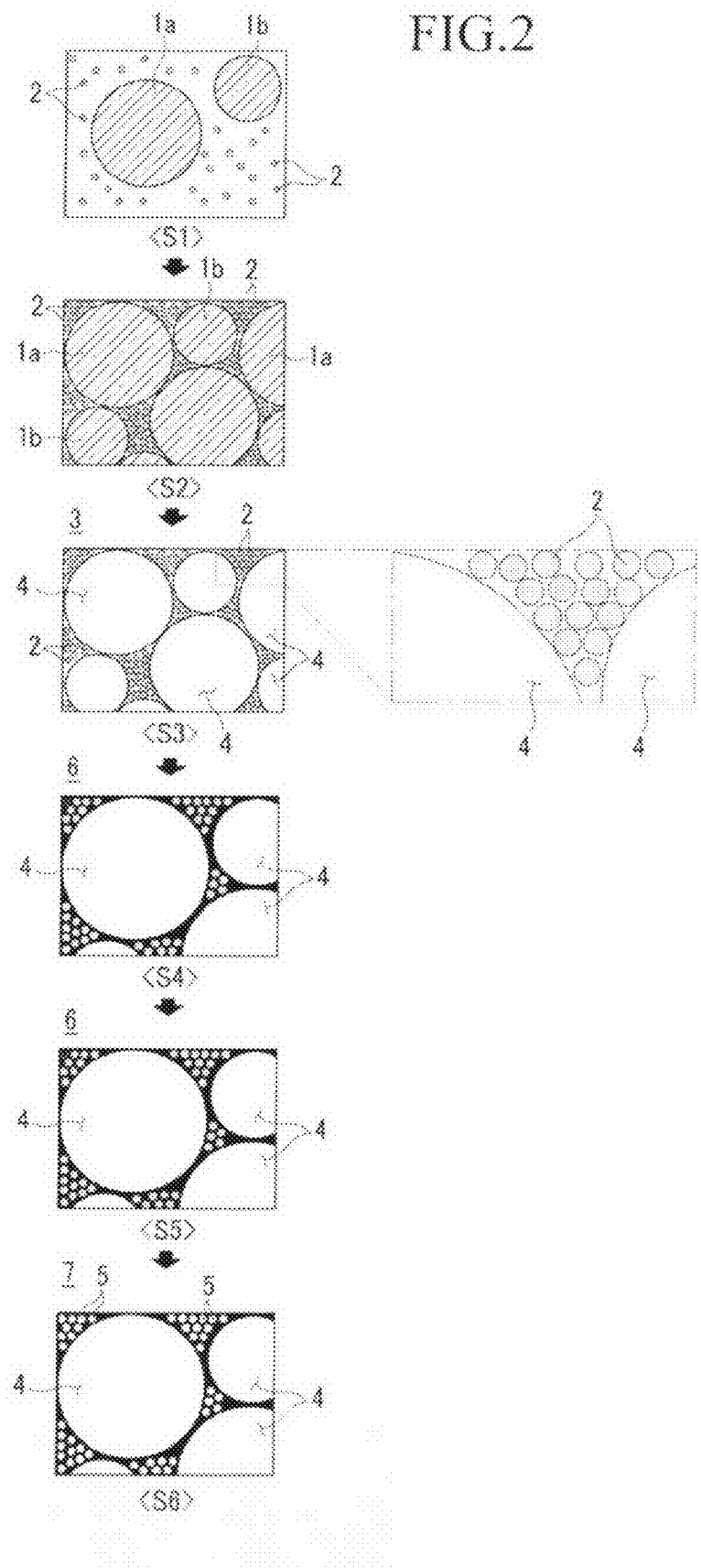
FIG. 2 is a schematic view showing a process for making a porous carbon structure according to one embodiment of the present invention.

FIG. 1 is a flow chart showing a process for making a porous carbon structure according to one embodiment of the present invention, and FIG. 2 is a schematic view showing a process for making a porous carbon structure according to the embodiment of the present invention. Hereinafter, referring to FIGS. 1 and 2, a process for preparing the porous carbon structure will be described in detail.

The method for constructing a porous carbon structure includes steps of preparing a mixture of mesopore-forming particles, at least two macropore-forming particles having different average particle diameters, and a solvent (S1); drying the mixture (S2); removing the macropore-forming particles from the dried mixture to make a macroporous template including at least two macropores having different average pore diameters (S3); injecting a carbon precursor between the mesopore-forming particles of the macroporous template to make a macroporous composite (S4); carbonizing the macroporous composite (S5); and removing the mesopore-forming particles from the macroporous composite to make a porous carbon structure including mesopores and at least two macropores having different average pore diameters (S6).

First, at least two macropore-forming particles 1a and 1b having different average particle diameters and mesopore-forming particles 2 are mixed in a solvent to produce a mixture (S1).

The macropore-forming particles may be any material that can be removed by a chemical or physical method. However, the macropore-forming particles should not be removed by the same method as the mesopore-forming particles. The chemical method includes a dissolving method and a physical method includes a firing method.

Examples of the macropore-forming particles include a polymer of a monomer selected from the group consisting of a radical polymerizable monomer, a multi-functional cross-linkable monomer, and combinations thereof; an oxide selected from the group consisting of $SiO_2$, $TiO_2$, $ZrO_2$, $Al_2O_3$, and combinations thereof; and mixtures thereof. The polymer of a monomer selected from the group consisting of a radical polymerizable monomer, a multi-functional cross-linkable monomer, and combinations thereof, and an oxide selected from the group consisting of $SiO_2$, $TiO_2$, $ZrO_2$, $Al_2O_3$, and combinations thereof, can be chemically removed. The polymer of a monomer selected from the group consisting of a radical polymerizable monomer, a multi-functional cross-linkable monomer, and combinations thereof can also be physically removed.

Examples of the radical polymerizable monomer include styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, fluorostyrene, alphamethylstyrene, vinyltoluene, and an aromatic vinyl-based monomer of chlorostyrene, a (meth)acrylate-based monomer such as methyl(meth)acrylate, ethyl(meth)acrylate, butyl(meth)acrylate, octyl(meth)acrylate, stearyl(meth)acrylate, benzyl(meth)acrylate, glycidyl(meth)acrylate, fluoroethylacrylate, trifluoroethylmethacrylate, pentafluoropropylmethacrylate, fluoroethylmethacrylate, hexafluorobutyl(meth)acrylate, hexafluoroisopropylmethacrylate, perfluoroalkylacrylate, octafluorophenylmethacrylate, and so on, vinylacetate, vinylpropionate, vinylbutylate, vinylether, allylbutylether, allylglycidylether, (meth)acrylic acid, unsaturated carboxylic acid such as maleic acid, alkyl(meth)acrylamide, and a vinyl cyanide monomer such as (meth)acrylonitrile, and mixtures thereof. A polymer of the radical polymerizable monomer may include polystyrene and polymethyl(meth)acrylate.

Examples of the multi-functional cross-linkable monomer include divinylbenzene, 1,4-divinyloxybutane, divinylsulfone, allyl compounds such as diallylphthalate, diallylacrylamide, triallyl(iso)cyanurate, triallyltrimellitate, and so on, hexanedioldiacrylate, ethyleneglycoldimethacrylate, diethyleneglycolmethacrylate, triethyleneglycoldimethacrylate, trimethylenepropanetrimethacrylate, 1,3-butanediolmethacrylate, 1,6-hexanedioldimethacrylate, pentaerythritoltetra(meth)acrylate, pentaerythritoltri(meth)acrylate, pentaerythritoldi(meth)acrylate, trimethylolpropane, tri(meth)acrylate, dipentaerythritolhexa(meth)acrylate, dipentaerythritolpenta(meth)acrylate, glyceroltri(meth)acrylate, allyl(meth)acrylate, and mixtures thereof.

The macropore-forming particles have an average particle diameter ranging from 100 nm to 2 μm. The average particle diameters fall into at least two different ranges. In one embodiment, the average particle diameter has 2 to 4 different ranges, and in another embodiment, the average particle diameter has 2 to 3 different ranges. In the above ranges, macropore-forming particles having a smaller average particle diameter may be disposed in a space between macropore-forming particles having larger average particle diameters.

The mesopore-forming particles may be a material that can be removed by a chemical or physical method. However, the mesopore-forming particles should not be removed by the same method as the macropore-forming particles. In one embodiment, when the macropore-forming particle is removed by a physical method, the mesopore-forming particles can be removed by a chemical method. In another embodiment, when the macropore-forming particles are removed by a chemical method, the mesopore-forming particles can be removed by a physical method.

The chemical method includes an etching or dissolving method, and the physical method includes a firing method.

Examples of the mesopore-forming particles includes a polymer of a monomer selected from the group consisting of a radical polymerizable monomer, a multi-functional cross-linkable monomer, and combinations thereof; microemulsion polymer beads of a monomer selected from the group consisting of a radical polymerizable monomer, a multi-functional cross-linkable monomer, and combinations thereof; an oxide selected from the group consisting of $SiO_2$, $TiO_2$, $ZrO_2$, $Al_2O_3$, and combinations thereof; a spherical-shape metal selected from the group consisting of copper, silver, and gold; and mixtures thereof. The polystyrene, polymethyl(meth)acrylate, $SiO_2$, $TiO_2$, $ZrO_2$, $Al_2O_3$, and so on can be removed using a chemical method such as etching or dissolving. The radical polymerizable monomer and multi-functional cross-linkable monomer are the same as those as in the macropore-forming particles.

The mesopore-forming particles have an average particle diameter of between 5 nm and 60 nm. According to another embodiment, it ranges from 15 nm to 50 nm. Within the range, it is possible to form mesopores having a suitable size in the resultant porous carbon structure, so it facilitates fuel flow and reactant release during a chemical reaction in a fuel cell.

The solvent does not dissolve both the macropore-forming particles and the mesopore-forming particles, and includes one selected from the group consisting of water, alcohol, ammonia water, and combinations thereof. In one embodiment, the solvent may be a mixed solvent of water and alcohol, and in another embodiment, the solvent may be a mixed solvent of water and ethanol. The macropore-forming particles and the mesopore-forming particles are dispersed in a solvent to form an emulsion.

The macropore-forming particles and the mesopore-forming particles are added in a weight ratio of 2:1. According to another embodiment, the weight ratio is 1.5:1. Within the range, it is possible to provide a porous carbon structure having various pore sizes by disposing the mesopore-forming particles in an empty space formed by conjugating the macropore-forming particles.

The mixture is then dried (S2). The drying process is carried out at a temperature of between 60 and 100° C. for 100 to 170 hours. According to another embodiment, it is carried out at a temperature of between 60 and 100° C. for 100 to 150 hours. According to further another embodiment, it is carried out at a temperature of between 70 and 80° C. for 120 to 130 hours. When the drying process is carried out at the stated temperature, it is possible to prevent the laminated macropore-forming particles and mesopore-forming particles from aggregating with each other. In addition, it is possible to perform the drying process allowing the mixture to stand at room temperature without a specific device.

The macropore-forming particles are removed to make a macroporous template 3 including at least two macropores 4 having different average pore diameters (S3). The macropore-forming particles can be removed by a chemical or physical method.

According to the chemical method, the macropore-forming particles are removed by an etching or dissolving method, and the mesopore-forming particles should not be removed at this time. In the etching method, a strong acid or base can be used. The strong acid includes fluoric acid, and the strong base includes sodium hydroxide and potassium hydroxide, but they are not limited thereto.

According to the physical method, the macropore-forming particles are removed by firing at a temperature of 500° C. to 700° C. In one embodiment, the firing can be performed at 550° C. to 600° C. In the above firing range, the size and spherical shape of the macropores can be maintained.

A carbon precursor is injected between the mesopore-forming particles of the macroporous template 3 including at least two macropores 4 having different average pore diameters to make a macroporous composite 6 (S4).

The carbon precursor may include at least one selected from the group consisting of a monomer, coal tar pitch, petroleum pitch, and another carbon precursor that can form graphitic carbon through a carbonization reaction, and combinations thereof.

Examples of the monomer are selected from the group consisting of divinylbenzene, acrylonitrile, vinyl chloride, vinylacetate, styrene, (meth)acrylate, methyl(meth)acrylate, ethyleneglycol di(meth)acrylate, urea, melamine, $CR_1R_2=CR_3R_4$ wherein $R_1$ to $R_4$ are the same or independently selected from the group consisting of hydrogen, an alkyl, and an aryl, and the alkyl is a $C_1$ to $C_5$ alkyl while the aryl is a $C_6$ to $C_{10}$ aryl, phenol-formaldehyde, phenol, furfuryl alcohol, resorcinol-formaldehyde (RF), aldehyde, sucrose, glucose, xylose, and combinations thereof.

When the initiator is added to the monomer, the polymer is generated by an addition polymerization reaction. The addition polymerization reaction is performed in accordance with the conventional method to be optimal for each compound. The polymerization reaction is performed at a temperature of between 60 and 90° C. for 3 to 30 hours, but it is not limited thereto. Within the temperature and the duration ranges, the yield and purity of the product are increased, and the monomer is polymerized on the pore surface of the template. Thereby, the pores are advantageously formed in the carbon structure.

When the monomer is selected from the group consisting of divinylbenzene, acrylonitrile, vinyl chloride, vinylacetate, styrene, (meth)acrylate, methyl(meth)acrylate, ethyleneglycol di(meth)acrylate, urea, melamine, $CR_1R_2=CR_3R_4$ wherein $R_1$ to $R_4$ are the same or independently selected from the group consisting of hydrogen, an alkyl, and an aryl, and the alkyl is a $C_1$ to $C_5$ alkyl while the aryl is a $C_6$ to $C_{10}$ aryl, and combinations thereof, the initiator may be selected from the group consisting of azobisisobutyronitrile (AIBN), t-butylperacetate, benzoylperoxide (BPO), acetylperoxide, and laurylperoxide.

When the monomer is selected from the group consisting of phenol-formaldehyde, phenol, furfuryl alcohol, resorcinol-formaldehyde, aldehyde, sucrose, glucose, xylose, and combinations thereof, the initiator may be an acid catalyst. The acid catalyst may be selected from the group consisting of sulfuric acid, hydrochloric acid, nitric acid, and combinations thereof.

The monomer and the initiator are added in a mole ratio ranging from 15:1 to 35:1. According to another embodiment, the mole ratio ranges from 25:1 to 20:1. Within the range, the polymerization is performed under a mild condition, and it is possible to obtain high purity products. If the mole ratio is out of the range and the amount of initiator is too low, it may cause problems in that the polymerization is discontinued.

The carbon precursor is injected at 40 to 10 wt % based on the total weight of the macroporous template. According to another embodiment, it ranges from 20 to 30 wt %. Within the range, it facilitates a lithograph solution flow.

The process of injecting the carbon precursor into a macroporous template is performed in accordance with a liquid method or a vapor method. The liquid method includes sedimentation, centrifugation, filtration, and so on. The liquid method is carried out by immersing the macroporous template into a carbon precursor solution. When the carbon precursor is a liquid, the macroporous template can be directly immersed therein. On the other hand, when the carbon precursor is a solid, a solvent of quinoline, toluene, alcohols, ketones, or a combination thereof may be used.

The vapor method includes, but is not limited to, vacuum vaporization, or vapor adsorption with heating in a reflux system except under vacuum. One example of the vapor method when the polymer precursor is subjected to the reaction under an acid catalyst may include substituting the surface of silica with the acid; heating the polymer precursor over the boiling point; and absorbing the polymer precursor gas onto the surface of the acid-substituted acid surface to polymerize the polymer precursor.

The macroporous composite 6 is subjected to carbonization (S5).

The carbonization step is performed at a temperature of between 700 and 3000° C. for 3 to 20 hours. According to another embodiment, it is performed at a temperature ranging from 900 to 2500° C. for 5 to 15 hours. Within the temperature and the duration ranges, the electronic conductivity is improved and it is possible to provide a carbon characteristic. When either the temperature or the duration is out of the ranges, it causes problems in that the carbon is not formed. Furthermore, a macroporous composite is firstly carbonized at a temperature ranging from 900 to 1300° C., the macroporous composite is etched with the strong acid and base, and it is secondly carbonized at a temperature ranging from 2300° C. to 2600° C. for 3 hours. Then, it is possible to improve the carbon characteristic, the electronic conductivity, and the performance of the carbon structure, so it can be applied to more various fields.

In the carbonization step, the temperature is increased at a speed of 1° C./min to 20° C./min. According to another embodiment, it ranges from 1° C./min to 10° C./min. Within the range, it is possible to minimize a terminal group change of the polymer and to increase the yield and the purity of carbon.

The mesopore-forming particles 2 are removed from the carbonized macroporous composite 6' to make a porous carbon structure 7 including mesopores 5 and at least two macropores 4 (S6). The mesopore-forming particles may be removed by a physical or chemical method.

According to the chemical method, the mesopore-forming particles are removed by an etching or dissolving method. In the etching method, a strong acid or base can be used. The strong acid includes fluoric acid, and the strong base includes sodium hydroxide and potassium hydroxide, but they are not limited thereto.

According to the physical method, the mesopore-forming particles are removed by firing at a temperature of 500° C. to 700° C. In one embodiment, the firing can be performed at 550° C. to 600° C. In the above firing range, the size and spherical shape of the mesopore-forming particles can be maintained.

The porous carbon structure made by the above process includes a porous matrix wherein mesopores are connected to each other, and the macropores have various sizes. The porous carbon structure has high electronic conductivity and a large specific surface area. Therefore, it can be used in various arts requiring such properties.

A catalyst for a fuel cell according to another embodiment includes the porous carbon structure. The catalyst includes the porous carbon structure and a catalyst material supported on the porous carbon structure.

The porous carbon structure is the same as the above-described.

The catalyst includes any catalyst that participates in a fuel cell reaction, for example a platinum-based catalyst. The platinum-based catalyst may be at least one selected from the group consisting of platinum, ruthenium, osmium, a platinum-ruthenium alloy, a platinum-osmium alloy, a platinum-palladium alloy, a platinum-M alloy where M is a transition element selected from the group consisting of Ga, Ti, V, Cr, Mn, Fe, Co, Ni, Cu, Zn, Sn, Mo, W, Rh, and Ru, and combinations thereof. Representative examples of the catalysts include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

An electrode for a fuel cell according to another embodiment of the present invention includes the catalyst.

The electrode includes an electrode substrate and a catalyst layer. The catalyst layer includes a catalyst that is the same as above-described. The catalyst layer may further include a binder resin to improve its adherence and proton transfer properties.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain. Non-limiting examples of the polymer include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly (perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The binder resins may be used singularly or in combination. They may be used along with non-conductive polymers to improve adherence with a polymer electrolyte membrane. The binder resins may be used in a controlled amount to be adapted to their purposes.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The electrode substrate supports catalyst layers and provides a path for transferring a fuel and an oxidant to catalyst layers in a diffusion manner. The electrode substrate is formed from a material such as carbon paper, carbon cloth, carbon felt, or a metal cloth (a porous film composed of a metal fiber or a metal film disposed on a surface of a cloth composed of polymer fibers). The conductive plate is not limited thereto.

The electrode substrate may be treated with a fluorine-based resin to be water-repellent, which can prevent deterioration of reactant diffusion efficiency due to water generated during fuel cell operation. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL) can be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, ketjen black, activated carbon, carbon fiber, fullerene, nano-carbon, or combinations thereof. The nano-carbon may include a material such as carbon nanotubes, carbon nanofiber, carbon nanowire, carbon nanohoms, carbon nanorings, or combinations thereof. The microporous layer is formed by coating the conductive substrate with a composition including a conductive powder, a binder resin, and a solvent. The binder resin may include, but is not limited to, polytetrafluoroethylene, polyvinylidenefluoride, polyvinylalcohol, celluloseacetate, or so on. The solvent may include, but is not limited to, an alcohol such as ethanol, isopropylalcohol, n-propylalcohol, butanol, and so on, water, dimethyl acetamide, dimethyl sulfoxide, or N-methylpyrrolidone. The coating method may include, but is not limited to, screen printing, spray coating, doctor blade methods, gravure coating, dip coating, silk screening, painting, and so on, depending on the viscosity of the composition.

According to another embodiment of the present invention, a membrane-electrode assembly including the electrode is provided. The membrane-electrode assembly includes an anode and a cathode, and a polymer electrolyte membrane disposed between the anode and cathode. The anode and cathode may be the electrode as above-described.

The polymer electrolyte membrane transfers protons from an anode to a cathode and therefore is formed of a proton conductive polymer. Examples of the proton conductive polymer are a polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The H can be replaced with Na, K, Li, Cs, or tetrabutylammonium in a proton conductive group of the proton conductive polymer. When the Na is substituted for H in an ion exchange group at the terminal end of the proton conductive group, NaOH is used. When the H is replaced with tetrabutylammonium, tributylammonium hydroxide is used. K, Li, or Cs can also be replaced by using appropriate compounds. A method of replacing H is known in this related art, and therefore is not further described in detail.

The following examples illustrate the present invention in more detail. However, it is understood that the present invention is not limited by these examples.

Example 1

Preparation of Porous Carbon Structure $SiO_2$ having an average particle diameter of 20 nm was dispersed in a mixed solvent of alcohol, distilled water, and ammonia to provide a 1.2% concentration colloidal dispersion. 700 ml of the dispersion, 200 ml of polystyrene spheres having an average particle diameter of 250 nm, and 200 ml of polystyrene spheres having an average particle diameter of 500 nm were mixed to provide a mixture. The mixture was dried at 70° C. for 7 days. The dried resultant was fired at 550° C. for 7 hours to volatilize the polystyrene spheres to provide a template. The polystyrene spheres were removed to provide two kinds of macropores respectively having average pore diameters of 240 nm and 490 nm. Then, 4 ml of divinyl benzene was mixed with 0.1845 g of azobisisobutyronitrile to provide a carbon precursor solution. 2 g of the template was placed into the carbon precursor solution and was vapor-adsorbed to fill the pores between $SiO_2$ particles with the carbon precursor to provide a macroporous composite. It was heated at 1000° C. for 7 hours and carbonized to provide a carbonized macroporous composite. The carbonized macroporous composite was introduced to 100 ml of a fluoric acid solution, and $SiO_2$ was dissolved to provide a porous carbon structure provided with two kinds of macropores respectively having average pore diameters of 227 nm and 481 nm and mesopores having an average pore diameter of 10 nm.

Example 2

Preparation of Porous Carbon Structure $SiO_2$ having an average particle diameter of 20 nm was dispersed into a mixed solution of alcohol, distilled water, and ammonia to provide a 1.2% concentration colloidal dispersion. 700 ml of the dispersion was mixed with 133 ml of polystyrene spheres having an average particle diameter of 250 nm, 133 ml of polystyrene spheres having an average particle diameter of 500 nm, and 133 ml of polystyrene spheres having an average particle diameter of 1000 nm to provide a mixture. A porous carbon structure was obtained in accordance with the same procedure as in Example 1, except that the provided mixture was used.

Example 3

Preparation of Porous Carbon Structure

A porous carbon structure was obtained in accordance with the same procedure as in Example 1, except that the polystyrene spheres having an average particle diameter of 250 nm and the polystyrene spheres having an average particle diameter of 500 nm were replaced with polymethyl(meth)acrylate spheres having an average particle diameter of 250 nm and polymethyl(meth)acrylate spheres having an average particle diameter of 500 nm.

Example 4

Preparation of Porous Carbon Structure

A porous carbon structure was obtained in accordance with the same procedure as in Example 1, except that 700 ml of a 1.2% concentration colloidal dispersion prepared by dispersing $SiO_2$ having an average particle diameter of 20 nm into a mixed solution of alcohol, distilled water, and ammonia was replaced with a 1.5% concentration colloidal dispersion prepared by dispersing $Al_2O_3$ having an average particle diameter of 20 nm into a mixed solution of alcohol and distilled water.

Example 5

Preparation of Porous Carbon Structure

A porous carbon structure was obtained in accordance with the same procedure as in Example 1, except that the polystyrene spheres having an average particle diameter of 250 nm and the polystyrene spheres having an average particle diameter of 500 nm were replaced with polystyrene spheres having an average particle diameter of 290 nm and polystyrene spheres having an average particle diameter of 500 nm.

COMPARATIVE EXAMPLE 1

Preparation of Porous Carbon Structure

A porous carbon structure was obtained in accordance with the same procedure as in Example 1, except that both 200 ml of the polystyrene spheres having an average a particle diameter of 250 nm and 200 ml of the polystyrene spheres having an average particle diameter of 500 ml were replaced with 400 ml of a polystyrene spheres having an average particle diameter of 290 nm.

COMPARATIVE EXAMPLE 2

Preparation of Porous Carbon Structure

A porous carbon structure was obtained in accordance with the same procedure as in Example 1, except that both 200 ml of polystyrene spheres having an average a particle diameter of 250 nm and 200 ml of polystyrene spheres having an average particle diameter of 500 ml were replaced with 400 ml of a polystyrene spheres having an average particle diameter of 500 nm.

Example 6 TO 10

Fabrication of Electrode for Fuel Cell

Each porous carbon structure according to Examples 1 to 5 was carried with 2 $mg/cm^2$ of commercial Pt manufactured by Johnson Matthey Co. to provide a Pt/C catalyst.

The Pt/C catalyst, distilled water, isopropylalcohol, and a Nafion ionomer solution (Aldrich Co., 5 wt %) were mixed in a weight ratio of 1:1:10:1 to provide a composition for a catalyst layer. The composition for a catalyst layer was coated on a carbon paper substrate treated with TEFLON (tetrafluoroethylene) to provide an electrode for a fuel cell.

COMPARATIVE EXAMPLE 3 TO 4

Fabrication of Electrode for Fuel Cell

An electrode for a fuel cell was fabricated in accordance with the same procedure as in Examples 6 to 10, except that each carbon structure according to Comparative Examples 1 and 2 was used.

COMPARATIVE EXAMPLE 5

Fabrication of Electrode for Fuel Cell

An electrode for a fuel cell was fabricated in accordance with the same procedure as in Examples 6 to 10, except that commercial Pt/C provided from Johnson Matthey Co. was used.

Example 11

Fabrication of Membrane-Electrode Assembly for Fuel Cell

2 $mg/cm^2$ of Pt—Ru black (manufactured by Johnson Matthey Co.) was supported in the porous carbon structure according to Example 1 to provide a Pt—Ru/C catalyst. The Pt—Ru/C catalyst, distilled water, isopropylalcohol, and Nafion ionomer solution (manufactured by Aldrich Co., 5 wt %) were mixed in a weight ratio of 1:1:10:1 to provide a catalyst layer composition for an anode.

Furthermore, 2 $mg/cm^2$ of Pt black (manufactured by Johnson Matthey Co.) was supported in the porous carbon structure according to Example 1 to provide a Pt/C catalyst. The Pt/C catalyst, distilled water, isopropylalcohol, and Nafion ionomer solution (manufactured by Aldrich Co., 5 wt %) were mixed in a weight ratio of 1:1:10:1 to provide a composition for a catalyst layer for a cathode.

A composition for a catalyst layer for an anode/cathode was coated on a carbon paper substrate treated with TEFLON (tetrafluoroethylene) to provide each an anode and a cathode for a fuel cell. Between the anode and the cathode, a polymer electrolyte membrane (Nafion 115 Membrane, Dupont) was interposed to provide a membrane-electrode assembly for a fuel cell.

Measurement of Current-Voltage

In respective reaction cells including an electrolyte of a 0.5 M sulfuric acid solution, a reference electrode of silver/silver chloride (Ag/AgCl), a working electrode of each electrode according to Examples 6 to 10 and Comparative Examples 3 to 5, and a counter electrode of a platinum electrode (Pt gauze, 100 mesh, Aldrich) were displaced.

Figure 3A:
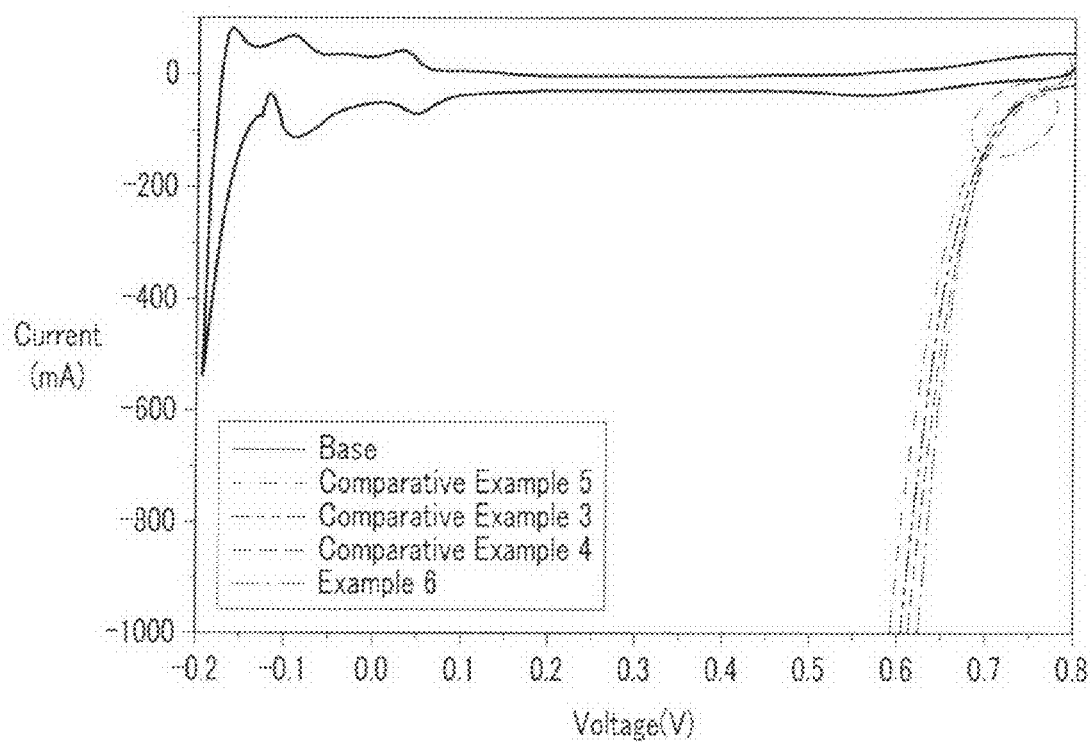
FIG. 3A is a graph showing cell performance of fuel cells including electrodes according to Example 6 and Comparative Examples 3 to 5.

In the reaction cell, the potential was varied at a scan rate of 20 mV/s within a range of −350 mV to 1350 mV to determine the current characteristic. The results were set as a base. In addition, while supplying a 1.0 M methanol solution, each reaction cell was examined to measure current characteristic by changing the potential from 350 mV to 1350 mV at a scan rate of 20 mV/s. Each of the results of the cells that included the working electrodes according to Example 6 and Comparative Examples 3 to 5 is shown in FIG. 3A. The circle of FIG. 3A is enlarged and shown in FIG. 3B.

Figure 3B:
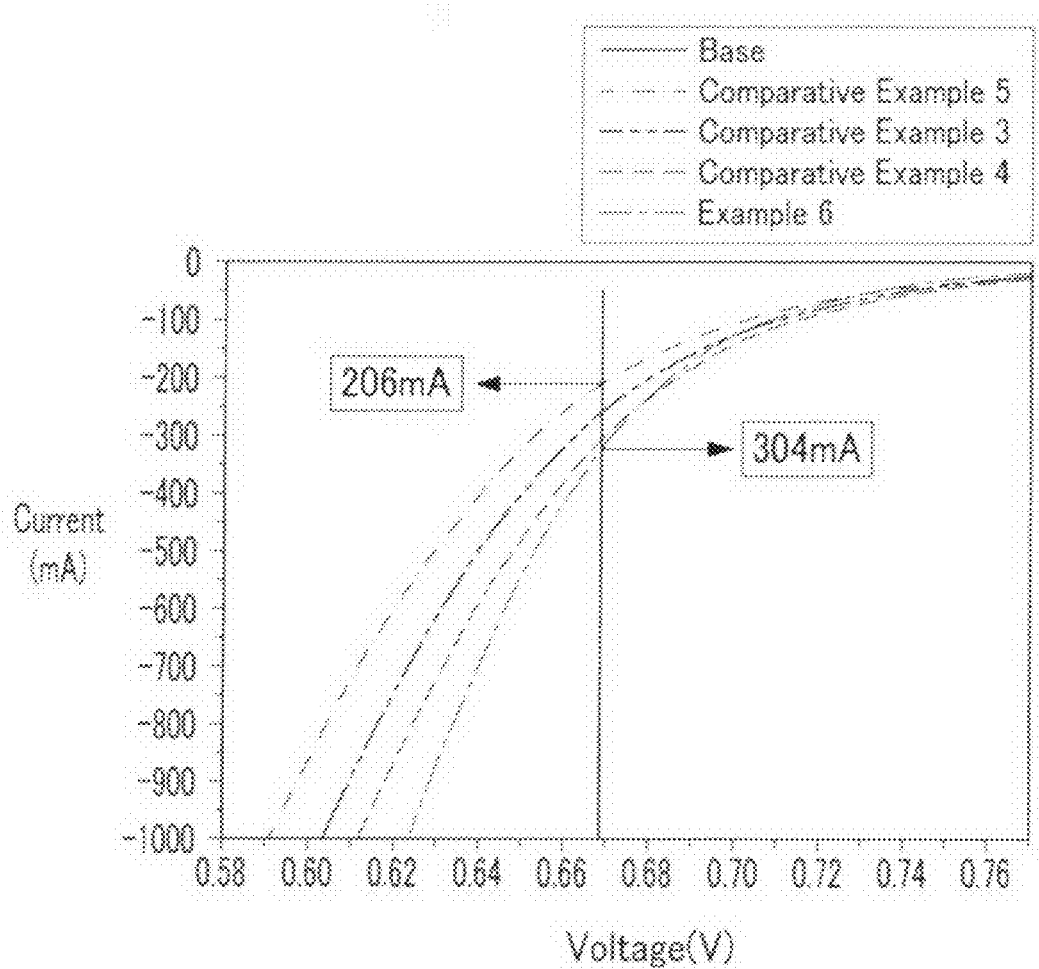
FIG. 3B is an enlarged view of the circle in FIG. 3A.

Referring to FIGS. 3A and 3B, when the electrode according to Example 6 was used as a working electrode, its performance improved by about 25% at the same voltage compared to those according to Comparative Examples 3 and 4.

Further, when the electrode according to Example 6 was used as a working electrode, its performance was improved by about 48% at the same voltage compared to that according to Comparative Example 5.

Measurement of TEM Photograph

Figure 4A:
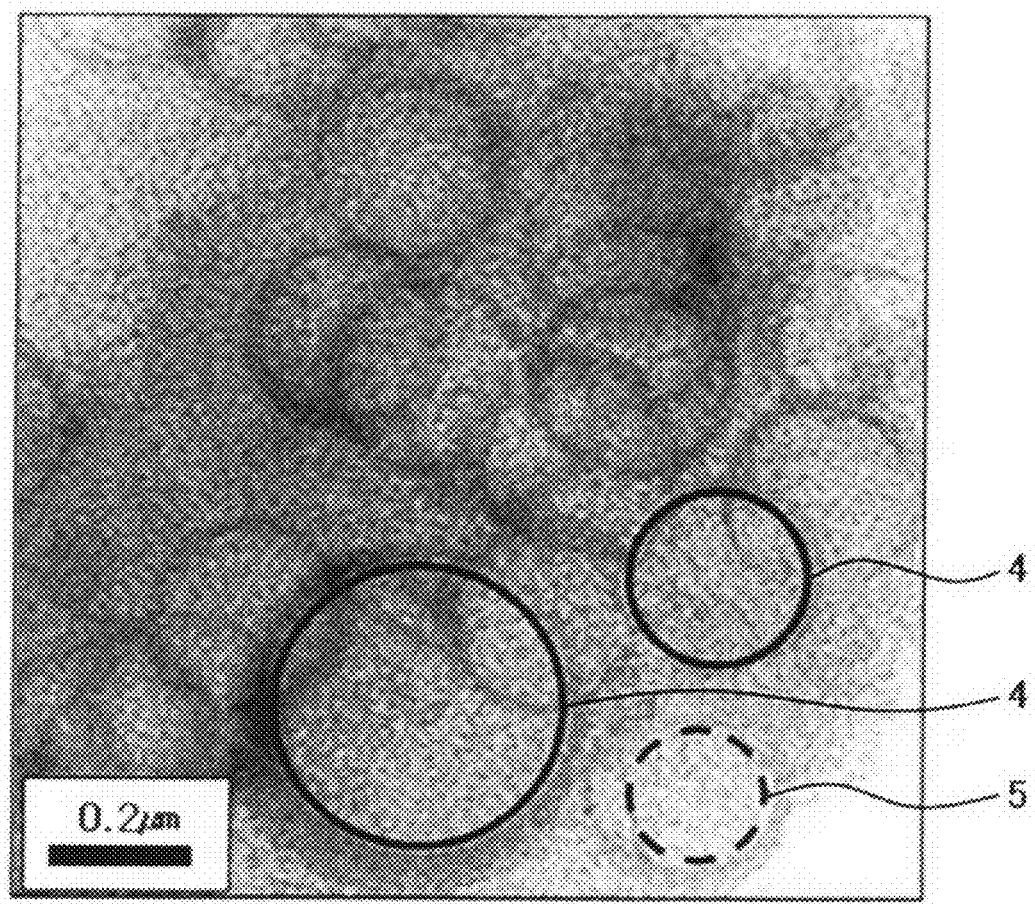
FIGS. 4A and 4B are TEM photographs of the porous carbon structure according to Example 1.
Figure 4B:
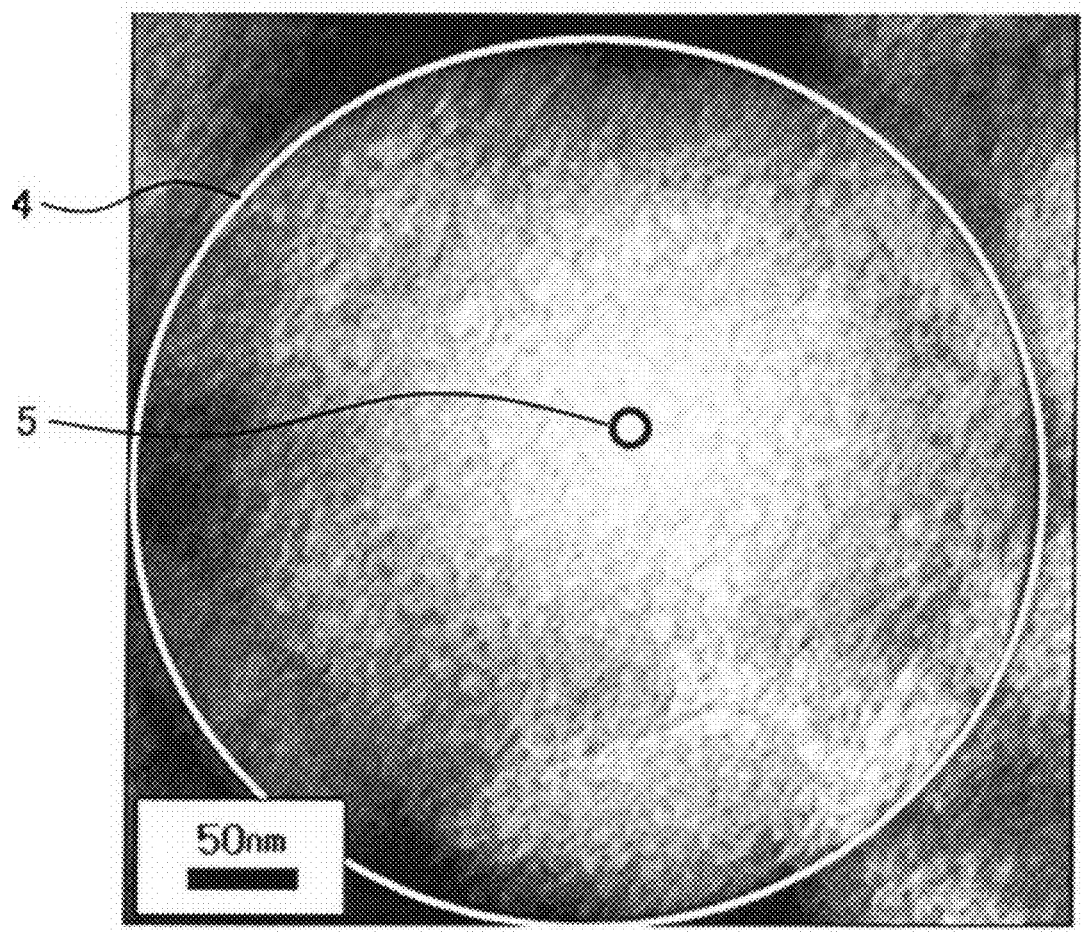

The porous carbon structures according to Examples 1 to 5 were subjected to TEM photography and SEM photography. FIG. 4A and FIG. 4B show TEM photographs according to Example 1, and FIG. 5 shows a SEM photograph thereof.

Figure 5:
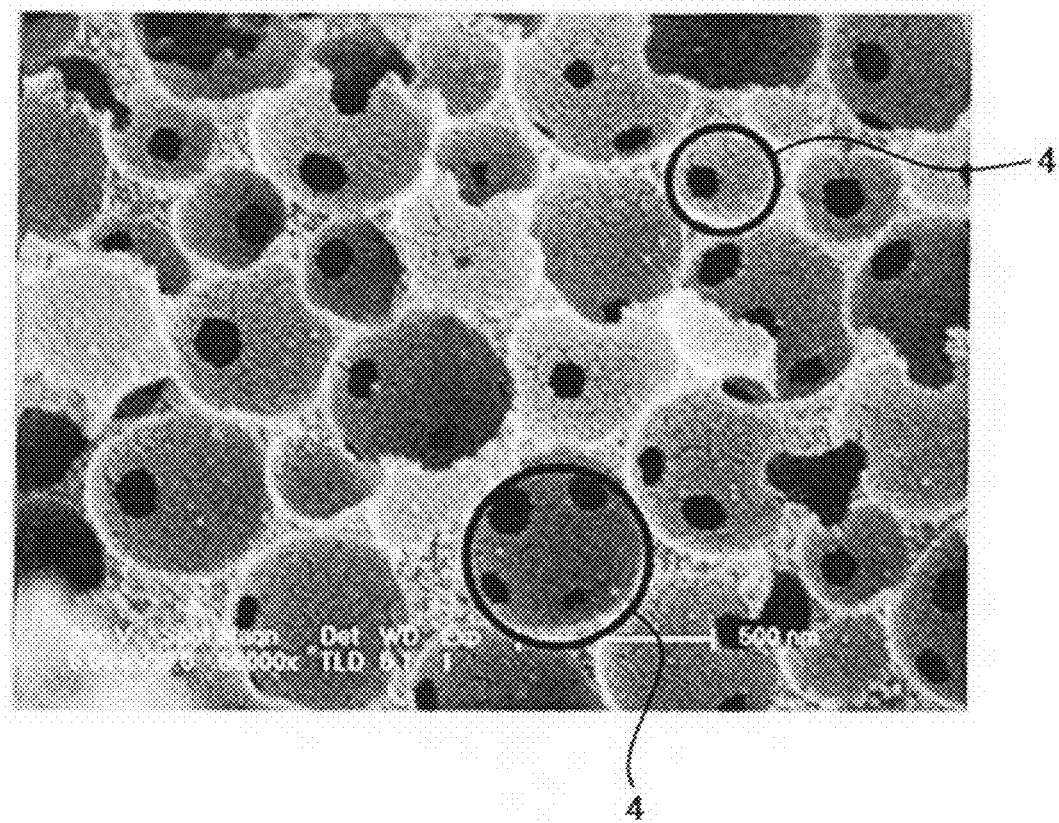
FIG. 5 is a SEM photograph of the porous carbon structure according to Example 1.

Referring to FIG. 4A, FIG. 4B, and FIG. 5, the porous carbon structure included two kinds of macropores respectively having average pore diameters of 227 nm and 481 nm, and mesopores having an average pore diameter of 10 nm.

Adsorption and Desorption Performance of $N_2$

Figure 6:
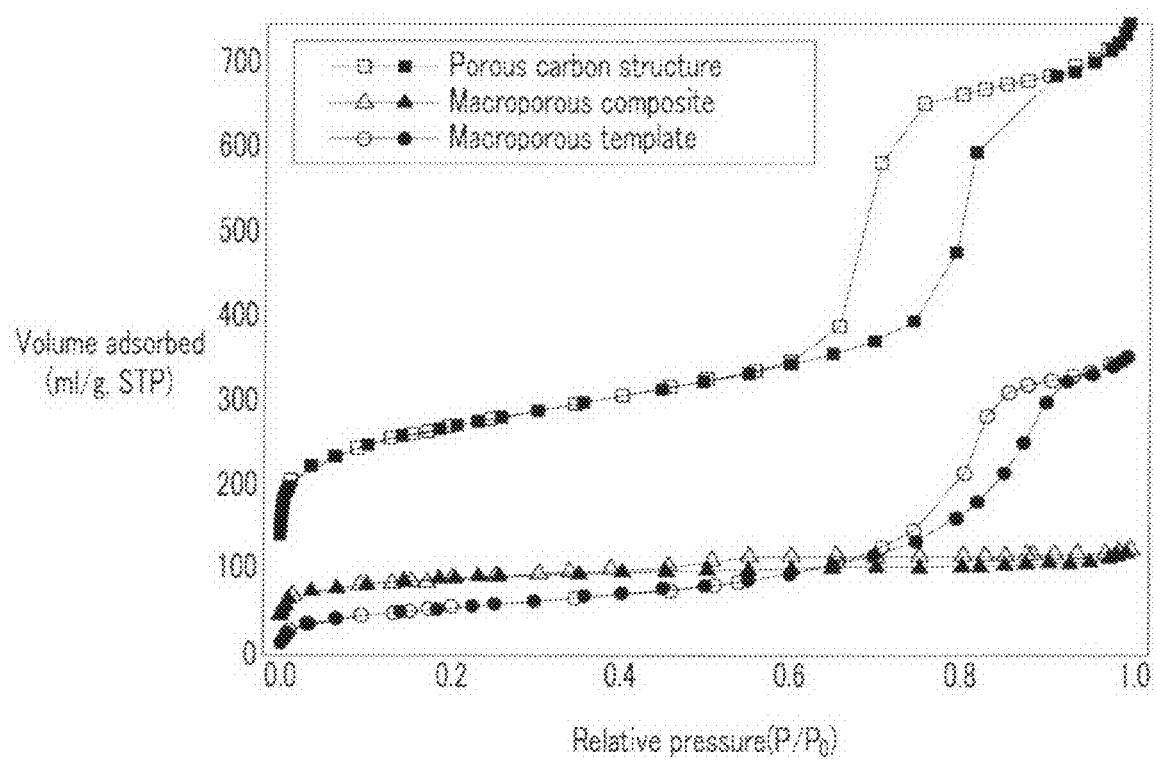
FIG. 6 is a graph showing $N_2$ adsorption and releasing performance of the porous carbon structure according to Example 1.

FIG. 6 shows BET analysis results of a macroporous template (polystyrene was removed by firing), a macroporous composite (carbon precursor was injected in empty spaces adjacent to silica of a macroporous template), and a porous carbon structure (silica was removed by etching after carbonizing a macroporous composite) obtained during the preparation of the porous carbon structure according to Example 1. In FIG. 6, black colored point indicators indicate absorption, and white colored point indicators indicate desorption.

Referring to FIG. 6, the isotherm of the porous carbon structure and the macroporous template according to Example 1 corresponded to type 4 having type 2 hysteresis (a phenomenon in which the distance between absorption and desorption curved lines increases in the graph) as defined in IUPAC. This is a typical characteristic of mesopores. Accordingly, the mesopores of the porous carbon structure are generated from the porous wall obtained by dissolving silica particles, and the mesopores of the macroporous template are generated from the gap between aggregated silica particles. The hysteresis change is generated from the process of duplicating the porous carbon structure from the macroporous template.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A porous carbon structure comprising:
   mesopores; and
   at least two kinds of macropores having different average pore diameters from each other.

2. The porous carbon structure of claim 1, wherein the macropores have an average pore diameter of 100 nm to 2 μm.

3. The porous carbon structure of claim 2, wherein the macropores have an average pore diameter of 100 nm to 1.2 μm.

4. The porous carbon structure of claim 3, wherein the macropores have an average pore diameter of 200 nm to 1 μm.

5. The porous carbon structure of claim 4, wherein the macropores have an average pore diameter of 250 nm to 500 nm.

6. The porous carbon structure of claim 1, wherein the porous carbon structure comprises two to four kinds of macropores having different average pore diameters from each other.

7. The porous carbon structure of claim 1, wherein the porous carbon structure comprises two to three kinds of macropores having different average pore diameters from each other.

8. The porous carbon structure of claim 1, wherein the mesopores have an average pore diameter ranging from 5 nm to 60 nm.

9. The porous carbon structure of claim 8, wherein the mesopores have an average pore diameter ranging from 15 nm to 50 nm.

10. A method for constructing a porous carbon structure, comprising:
    preparing a mixture of mesopore-forming particles, at least two different kinds of macropore-forming particles having different average particle diameters from each other, and a solvent;
    drying the mixture;
    removing the macropore-forming particles from the dried mixture to make a macroporous template that includes at least two kinds of macropores having different average pore diameters from each other;
    injecting a carbon precursor between the mesopore-forming particles of the macroporous template to make a macroporous composite;
    carbonizing the macroporous composite; and
    removing the mesopore-forming particles from the macroporous composite to make a porous carbon structure that includes mesopores and at least two kinds of macropores having different average pore diameters from each other.

11. The method of claim 10, wherein the step of removing the micropore-forming particles is chemically or physically performed.

12. The method of claim 11, wherein the macropore-forming particles are selected from the group consisting of a polymer of a monomer selected from the group consisting of a radical polymerizable monomer, a multi-functional cross-linkable monomer, and combinations thereof; an oxide selected from the group consisting of $SiO_2$, $TiO_2$, $ZrO_2$, $Al_2O_3$, and combinations thereof; and mixtures thereof.

13. The method of claim 10, wherein the step of removing the mesopore-forming particles is chemically or physically performed.

14. The method of claim 13, wherein the mesopore-forming particles comprise one selected from the group consisting of a polymer of a monomer selected from the group consisting of a radical polymerizable monomer, a multi-functional cross-linkable monomer, and combinations thereof; microemulsion polymer beads of a monomer selected from the group consisting of a radical polymerizable monomer, a multi-functional cross-linkable monomer, and combinations thereof; an oxide selected from the group consisting of $SiO_2$, $TiO_2$, $ZrO_2$, $Al_2O_3$, and combinations thereof; a spherical shape metal selected from the group consisting of copper, silver, and gold; and mixtures thereof.

15. The method of claim 10, wherein the solvent is selected from the group consisting of alcohol, water, ammonia water, and combinations thereof.

16. The method of claim 10, wherein the step of drying the mixture is performed by maintaining the mixture at a temperature between 60° C. to 100° C.

17. The method of claim 10, wherein the step of injecting the carbon precursor is performed by a liquid method or a vaporization method.

18. An electrode catalyst comprising:
a porous carbon structure that comprises:
mesopores, and
at least two kinds of macropores having different average pore diameters from each other; and
a catalyst material supported on the porous carbon structure.

19. The electrode catalyst of claim 18, wherein the macropores have an average pore diameter of 100 nm to 2 μm.

20. The electrode catalyst of claim 18, wherein the porous carbon structure comprises two to four kinds of macropores having different average pore diameters from each other.

21. The electrode catalyst of claim 18, wherein the mesopores have an average pore diameter ranging from 5 nm to 60 nm.

22. The electrode catalyst of claim 18, wherein the catalyst material includes one selected from the group consisting of platinum, ruthenium, osmium, a platinum-ruthenium alloy, a platinum-osmium alloy, a platinum-palladium alloy, a platinum-M alloy where M is a transition element selected from the group consisting of Ga, Ti, V, Cr, Mn, Fe, Co, Ni, Cu, Zn, Sn, Mo, W, Rh, Ru, and combinations thereof.

23. An electrode for a fuel cell comprising:
an electrode substrate; and
a catalyst layer disposed on the electrode substrate, the catalyst layer comprising an electrode catalyst that comprises:
a porous carbon structure comprising mesopores and at least two kinds of macropores having different average pore diameters from each other; and
a catalyst material supported on the porous carbon structure.

24. A membrane-electrode assembly for a fuel cell, comprising:
an anode and a cathode; and
a polymer electrolyte membrane dispose-d between the anode and the cathode, at least one of the anode and the cathode comprising a porous carbon structure for a catalyst carrier, the porous carbon structure comprising:
mesopores, and
at least two kinds of macropores having different average pore diameters from each other.

* * * * *